US006958783B2

(12) United States Patent
Alvarez

(10) Patent No.: US 6,958,783 B2
(45) Date of Patent: Oct. 25, 2005

(54) ADAPTIVE NON-LINEAR NOISE REDUCTION TECHNIQUES

(75) Inventor: José Roberto Alvarez, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 566 days.

(21) Appl. No.: 10/196,009

(22) Filed: Jul. 16, 2002

(65) Prior Publication Data

US 2004/0012721 A1 Jan. 22, 2004

(51) Int. Cl.[7] ........................... H04N 5/213; H04N 5/21

(52) U.S. Cl. ....................... 348/618; 348/607; 348/627; 382/262

(58) Field of Search ................................ 348/618, 607, 348/606, 620, 616, 617, 622, 466, 624, 625, 627; 382/261, 262; 455/307; 358/3.26, 3.27, 447, 463

(56) References Cited

U.S. PATENT DOCUMENTS 4,682,230 A 7/1987 Perlman et al.
4,783,840 A * 11/1988 Song .......................... 382/261
5,148,278 A * 9/1992 Wischermann .............. 348/609
5,268,760 A * 12/1993 Suyama ...................... 348/624
5,384,865 A * 1/1995 Loveridge ................... 382/262
5,389,978 A * 2/1995 Jeong-Hun .................. 348/622
5,414,472 A * 5/1995 Hwang ....................... 348/616
5,701,163 A * 12/1997 Richards et al. ............ 348/578
6,094,231 A 7/2000 Wischer-Mann
6,295,382 B1 * 9/2001 Karanovic .................. 382/261
6,834,124 B1 * 12/2004 Lin et al. .................... 382/261

FOREIGN PATENT DOCUMENTS

DE 196 36 867 C 1/1998

OTHER PUBLICATIONS

N. R. Harvey et al., *Application of Non–linear Image Processing: Digital Video Archive Restoration*, IEEE (1997) 731–734, University of Strathclyde, Scotland.

Si Jun Huang, *Adaptive Noise Reduction And Image Sharpening For Digital Video Compression*, IEEE (1997) 3142–3147, Scientific–Atlanta Inc., USA.

* cited by examiner

*Primary Examiner*—John Miller
*Assistant Examiner*—Jean W. Désir
(74) *Attorney, Agent, or Firm*—McAndrews, Held & Malloy, Ltd.

(57) ABSTRACT

An impulse-reducing module (200) reduces random noise in video pixels by providing an impulse detector (244) and an impulse reducer, such as a median filter (250). The impulse detector (244) generates filter control signals in response to detection of impulses, and the median filter (250) generates filtered pixel values in response to the filter control signals. The control signals set the median filter to a plurality of filter operating modes.

22 Claims, 8 Drawing Sheets

ADAPTIVE NON-LINEAR NOISE REDUCTION TECHNIQUES

BACKGROUND OF THE INVENTION

This invention relates to reduction of noise in video pixels and more particularly relates to such reduction using impulse reducing techniques.

One application of this invention is digitally removing noise from video sequences that have been digitized from the analog domain in order to increase the efficiency of a digital video compression system. A digital compression system in general takes advantage of redundant information in a video sequence in order to reduce the amount of data needed to represent the video sequence. The removal of this redundant information and subsequent coding of the video sequence produces a compressed bit stream that represents the original video sequence. The quality of the decompressed bit stream back into a video sequence depends on the ratio between the original amount of video data and the compressed bit stream data, and the efficiency with which the compression system is able to encode the information. For example, for a given sequence, the higher the compression ratio the smaller the bit stream produced. As the compression ratio increases, there is a point in which non-redundant information is degraded or lost to the compression process, therefore producing objectionable image artifacts.

In image/video compression systems, fine image details require relatively more bits to code than coarse image details, and therefore produce larger bit streams. For example, images of buildings with intricate wall details would require more bits than the clear blue sky with no clouds behind them. This fine image detail is represented as high frequency two-dimensional information; while the coarse image detail is represented as low frequency two-dimensional information that may include DC frequency, i.e. zero frequency. For purposes of this specification, it is assumed that the high-frequency detail is non-redundant and therefore necessary for a faithful rendition of the original video sequence.

Some high-frequency information is not related to actual image detail but to random noise in the original input sequence. Noise can be introduced in the video sequence in both analog and digital domains. In the analog domain, noise can be created by recording and playback of the video sequence from video tape, by errors introduced in transmission, by interference created by external sources during transmission, and other similar causes. In the digital domain, random noise can be generated by the analog-to-digital conversion process, thermal noise in components, electronic interference, etc. The two main types of noise discussed in this specification can generally be described as random. Two examples of such random noise are: random-white-gaussian-distributed noise; and random-impulsive noise. These types of noise are referred to by different names in the industry, including, 'snow', 'gaussian noise', 'tape noise' for the first type above; and 'impulsive noise', 'salt and pepper noise', 'speckle noise' for the second type.

The compression system itself has no way of knowing that some high-frequency information is random noise and therefore irrelevant to image content. If this random noise is not removed from the original video sequence, it will be coded (compressed) as part of the bit stream therefore causing degradation in quality because bits that could have been used to represent actual image information are being wasted to represent noise.

Therefore, to increase the efficiency of a digital compression system, it is desirable to reduce the amount of random noise in the original sequence so that all coded bits in the compressed bit stream represent actual picture information.

A very simple way used by prior art to reduce the high-frequency content of video sequences is the application of a low-pass filter (LFP) to an input video sequence. This LPF effectively reduces and even eliminates some high frequencies depending on the low-pass cut-off frequency characteristic. However, actual high-frequency image details are eliminated together with high-frequency noise, therefore producing a 'soft' picture.

Another known way to reduce random noise is to use an adaptive two-dimensional filter that preserves some high-frequency image details, like edges of objects. However, the detection of edges themselves can be affected by the noise along the edges; and depending on the low-frequency cut-off point, the images may still look soft. Furthermore, the edge detection is performed statically without regard to edge motion across time.

Other known temporal filters derive motion information from both luminance and chrominance separately, not taking advantage of the correlation between the two signals. Moreover, when other known systems reduce impulsive speckles, they use the filters in open loop mode without validation and correlation of actual impulsive spikes in the input video. Indiscriminant use of a median operator is likely to produce adverse artifacts, especially in the vertical direction.

Prior art systems have failed to recognize the utility of a median filter operation in the motion detection path which is used to eliminate impulses not in the image domain but in the motion/temporal domain. This operation makes a recursive filter perform better by controlling the value of the coefficient that controls the recursive time constant of the filter itself.

There are known temporal noise reduction systems that use motion estimation techniques instead of motion detection techniques. However, the motion estimation process is complex and does not fully guarantee the elimination of noise, just reduction.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

One apparatus embodiment of the invention is useful for reducing random noise in video pixels having digital pixel values by processing the pixel values. In such an environment, the apparatus comprises an impulse detector arranged to perform a step impulse detecting process and to generate control signals in response detection of step impulses represented by the pixel values, and an impulse reducer responsive to the pixel values and the control signals to generate filtered pixel values with reduced impulses.

One method embodiment of the invention is useful for reducing random noise in video pixels having digital pixel values by processing the pixel values. In such an environment, the method comprises performing a step impulse detecting process to generate control signals in response detection of step impulses represented by the pixel values, and generating impulse-reduced pixel values in response to the pixel values and the control signals.

By using the foregoing techniques, noise in video signals can be reduced with a degree of ease and accuracy previously unavailable.

These and other advantages and novel features of the present invention, as well as details of an illustrated embodiment thereof, will be more fully understood from the following description and drawings.

DETAILED DESCRIPTION OF THE INVENTION

Figure 1:
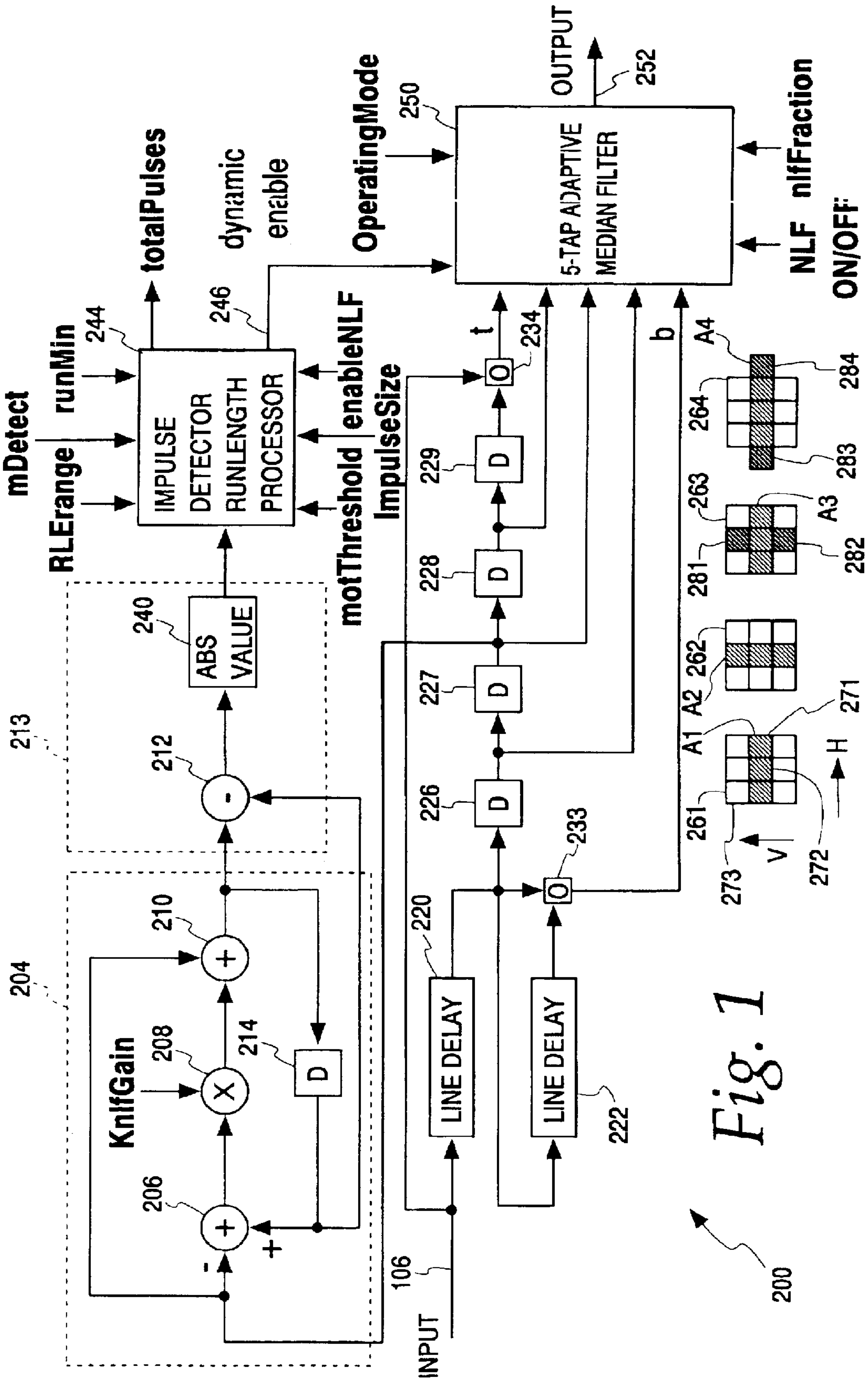
FIG. 1 is a schematic block diagram of a first embodiment of an impulse reducer in the form of a motion adaptive non-linear filter made in accordance with the invention and incorporating an impulse detector.

In general, the embodiments shown in the drawings use a combination of spatial and temporal impulse reducing mechanisms to reduce random noise in an input video sequence. The mechanisms may employ filtering that is applied dynamically on a pixel-by-pixel basis by programming the behavior of the different processing modules and by controlling the noise reduction process adaptively according to the output of an impulse detector. Other types of impulse reducing also may be employed, such as software that changes the value of a pixel within a plurality of pixels. The change may increase the value of the lowest-valued pixel that is less than a first threshold and/or decrease the value of the highest valued pixel greater than a second threshold. The embodiments shown in the drawings include an impulse noise reduction filter and the associated modules to control the filtering process on a pixel-by-pixel basis.

Additional details about the impulse reducer and other aspects of the various embodiments are described in the application entitled "Digital Noise Reduction Techniques," filed on the same day as this application in the name of Jose Alvarez and incorporated by reference in its entirety into this application.

One embodiment makes use of a median operator acting directly on the motion signal in order to detect impulses in the motion signal that may be caused by spurious noise in the input video signal.

The input video sequence is analyzed specifically to detect impulsive noise in order to control the impulsive noise reduction filter.

The quality of encoded video can be improved by properly preprocessing a video input signal. One important aspect quality improvement is to remove unwanted or irrelevant picture information, for instance, random noise. Video material in the real world contains various kinds of noise that can be characterized in several ways as gaussian white noise, impulsive noise, interference noise, signal noise, and others.

The embodiments shown in the drawings rely on an adaptive noise-reduction process. In the present context, an adaptive process is one which is able to change according to the nature of the image content on a pixel-by-pixel basis.

The blocks shown in the drawings may be implemented by a combination of hardware capabilities and firmware intervention based on hardware assistance.

The digital signal processing structures described in this specification make the implicit assumption that chrominance (C) is processed in the same manner as luminance (Y), unless otherwise specified. Each chrominance component (Cb, Cr) is processed individually; therefore, filters keep intermediate results for each component.

Implicit in the Figures is the insertion of matching processing delay elements. One example is the initial motion detection signal mDetect described in following sections. This signal is used to control the processing at various stages, but must be properly delayed to match the corresponding pixel being processed as the video signal travels through the processing elements. An initial motion signal mDetect is supplied to the impulse detector of a noise or impulse reduction module 200. The initial motion signal also is used by module 200 to detect and apply a two-dimensional median filter structure to data. The mDetect signal is generated by applying a two dimensional smoothing filter to the input pixels. The mDetect signal estimates motion of images represented by the input pixels.

In some sections of this specification, the term "current frame" indicates the luminance and chrominance signals as they are obtained directly from the digital video input port 12.

It is assumed that all signal gain changes are properly saturated and clipped to values 0 to 255, including cases where there could be arithmetic shifts in the left or right directions. All FIR low-pass filters used in described embodiments have positive coefficients that add up to 1.0 (256) and therefore have unity gain at DC. The high-pass filters used are first order with also no gain at DC. Filter coefficients are assumed to be 8-bit quantities. All intermediate computations should be kept at full accuracy and only rounded at interface outputs.

Impulsive noise is random, but has a very specific structure which is manifested in high contrast dots and picture strikes along the horizontal line, creating all sorts of random speckles in the sequence. This type of noise is knows as salt-and-pepper or partial line drops.

Both types of random noise have detrimental effects in the compression process. There is no way for the encoder to know if the high frequency content is picture information or noise. Therefore, reducing the random noise in the input video sequence can improve compression quality in many cases. However, the characteristics of the filter are dynamically changed to avoid artifacts, such as motion blur, ghosts, and other non-linearities caused by improper setting of filter coefficients.

An image characterization module 400 (FIG. 3) keeps a record of the amount of motion of images in the current frame represented by pixels of the current frame, as well as a record of the data currently being processed. The main purpose of module 400 is to help the firmware decide on the optimal system parameters on a field-by-field basis. However, in other applications, the firmware may exercise control on a horizontal (i.e., line-by-line) basis.

Reducing noise is a compromise between the effectiveness of filtering and artifacts created due to motion. The control registers described at the end of this specification provide the ability to change the performance of module 200 under a wide variety of input sources and images sequences.

Module 200 reduces impulsive-type noise in the video sequence. As shown in FIG. 1, one embodiment of module 200 includes an infinite impulse response filter 204 used as a horizontal low pass filter that comprises arithmetic operators 206, 208, and 210 that perform that operations of addition, multiplication, and addition, respectively. A delay operator 214 is connected as shown. A differential processor 213 includes an arithmetic operator 212 that performs the operation of subtraction and an absolute value operator 240. Operator 212 detects changes in the output of filter 204 and is further processed by operator 240 in order to detect impulsive steps by an impulse detector 244.

Input 106 receives pixels having pixel values from a digital video input and the pixels are delayed with delay lines 220 and 222. Additional signal delays are provided by delay operators 226–229 connected as shown. The output of delay 227 provides an input to filter 204. Selection operators 233 and 234 are used to modify the horizontal/vertical nature of an impulse reducer, such as a median filter 250. Operator 233 selects between a pixel 281 of a pixel structure 263 and a pixel 283 of a pixel structure 264. Operator 234 selects between a pixel 282 of structure 263 and a pixel 284 of structure 264.

The absolute value of the output of filter 204 is generated by an absolute value operator 240. An impulse detector 244, organized as a run length processor, generates filter control signals on a path 246. An impulse reducer, such as five-tap adaptive median filter 250, generates second filtered pixel values on an output path 252.

Module 200 is based on an impulse reducer, such as two-dimensional median filter structure 250, that can be configured in several operating modes.

```
    #define   MED_MODE_HORZ      0   //            3-tap
Horizontal Median Filter
    #define   MED_MODE_VERT      1   //     3-tap Vertical
Median Filter
    #define   MED_MODE_HV        2   //            5-tap
Horizontal/Vertical (Cross) Median
    #define   MED_MODE_HORZ5     3   //            5-tap
Horizontal only Median Filter
```

The basic functionality of the median filter 250 is based on an order ranking of all input values and a selection of the value that resides arithmetically in the middle of the distribution. The output of the median filter is based on the value of the center pixel according to the following algorithm (where c denotes the value of the center pixel, fraction_of_c denotes a scaled down version of c by a shift indicated with the register nlfFraction, and m denotes the value of the ranking operator):

fraction_of_*c*=(*c*>>nlfFraction);

result=(*abs*(*m*−*c*)>fraction_of_*c*)?*m*:*c*;

If the two-dimensional filter 250 is used for every pixel in the image, it will successfully reduce impulsive noise, but it will also either soften the image and may produce non-linear artifacts that will be detrimental for further compression. Non-linearities are especially visible when using the median filter in the vertical 3-tap mode. The median filter 250 is turned on when the input sequence requires it and in the areas that are most critical for operation, especially in cases where there are many impulsive steps.

The input to the noise reduction module 200 comes over a path 106. Path 106 includes a path that transmits a processed luminance value and a path that transmits a processed chrominance value. The same data path 106 is used for both the luminance and chrominance signals in FIG. 1. The processing starts by using IIR filter 204 to low-pass the pixel values in order to eliminate high frequency details and to be able to give a clean signal to the RunLength Processor 250. This low-pass filtering operation is especially useful when the recursive noise reduction filter is not operational.

Figure 2:
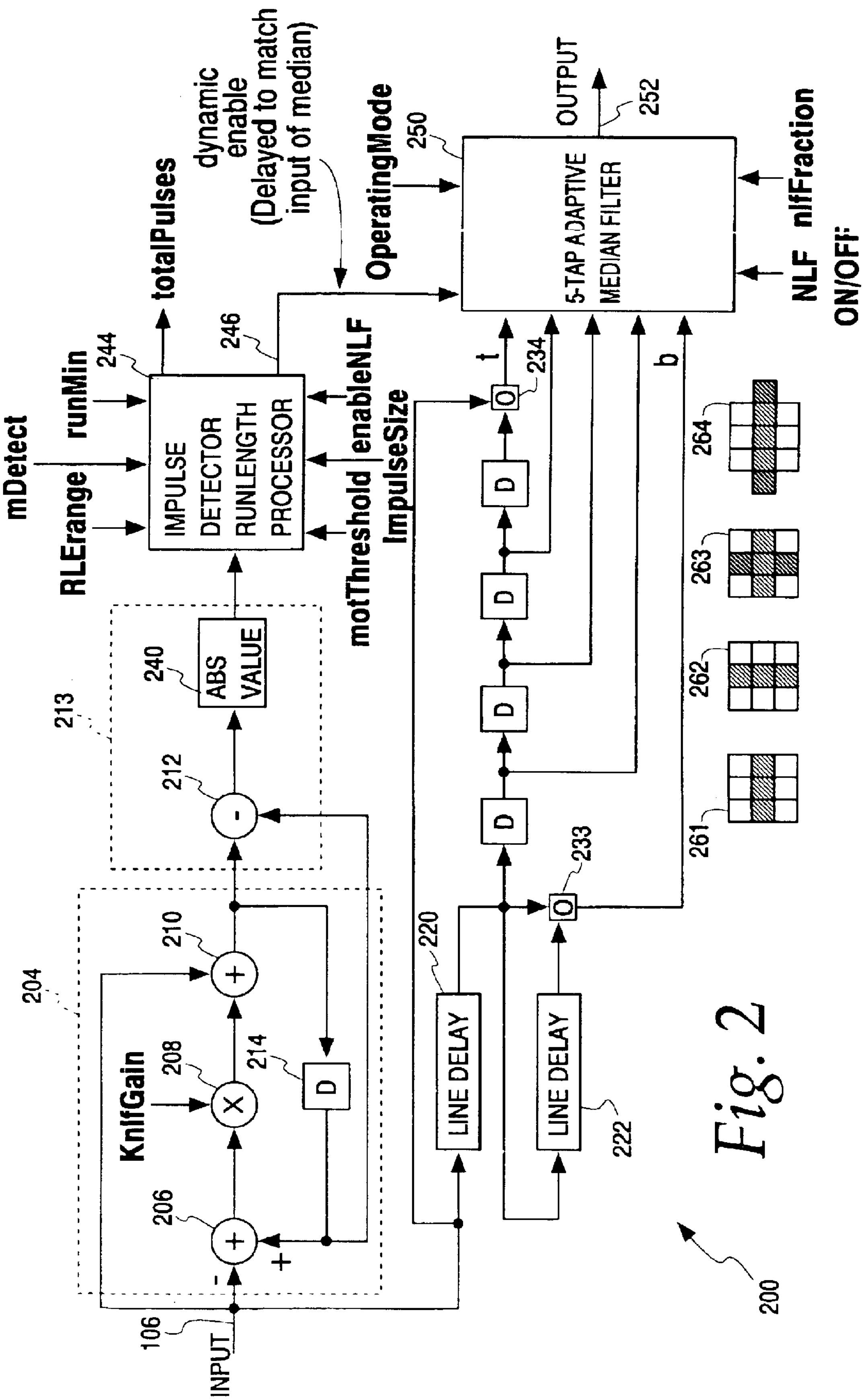
FIG. 2 is a schematic block diagram of a second embodiment of a motion adaptive non-linear filter made in accordance with the invention.

FIGS. 1 and 2 show two alternative architectures for module 200 depending on where to apply the matching processing delays. In both FIGS. 1 and 2, it is implicitly assumed that there are sample delays in the connecting arrows so that the processing samples line up as indicated by the shaded squares in the structures 261–264 at the bottom of the figures. Structures 261–264 represent areas of the current frame of pixels that define a vertical direction V and a horizontal direction H. A current horizontal line of pixels is represented by a line 271 that includes a pixel 272 currently being processed by preprocessor 10. A horizontal line 273 above line 271 was processed before line 271. Therefore, the boxes indicating line delays (e.g., 226–229) are assumed to be configured so that the timing of the samples into the median filter 250 line up as indicated in the cross-hatched two-dimensional structures 261–264 at the bottom of FIGS. 1–2. (This implies delays of approximately one line (e.g., line 271) when horizontal and processing delays are taken into account.)

The cross-hatched structures also represent areas of a frame indicated by A1–A4. The cross hatched areas constitute the pixels in the frame to be processed by filter 250.

FIG. 2 assumes that there is a matching delay at the run length processor 244. FIG. 1 assumes that all results are delayed by approximately one line and the needed processing delay in the run length processor 244 is reduced to a few samples (adjusted appropriately in the line delay elements).

Referring to FIG. 1, impulse detector 244 identifies the occurrence of high contrast steps in the picture or image represented by the pixels of the current frame. These steps are one type of impulsive noise that is manifested as strikes and partial line dropouts.

Impulse detector 244 generates a first signal when it interprets a change in the value of the absolute difference between adjacent pixels as a discontinuity (impulseSize) and therefore the potential for finding a step in the input pixels. When the absolute value of the difference between adjacent horizontal pixels is below a threshold range RLErange and the value of the original pixel is very bright or very dark (outside the range impulseLevelHigh−impulseLevelLow), detector 244 generates a second signal by identifying the discontinuity in pixel values as an impulse or step to be considered for elimination. At this point, detector 244 starts counting the length of the step, and if it is greater than runMin (a predetermined number of consecutive pixels), detector 244 marks the step as a potential step pulse transition by generating a third signal. If the step happens to coincide with a large amount of motion detected (motThreshold) for the area, dynamicEnable, a filter control signal, is set as an indication that a step/strike/speckle exists in the input video, and the value of totalPulses is incremented.

Module 200 will be active if it has been enabled by enableNLF=true and if there has been a step detected of at least a duration in pixels of runMin and if the motion detected has exceeded a certain threshold value motThreshold. Module 200 considers only impulse steps of value greater than ImpulseLevelHigh or less than ImpulseLevelLow for counting and evaluating. If adjacent pixel values are within the range RLErange, they are considered as part of a continuous step.

The detector 244 process described above is not intended for detecting salt-and-pepper noise, although it may be used to do so, but yielding a redundant operation. However, when attempting to reduce salt-and-pepper impulsive noise, mode 0 or mode 3 of filter 250 (i.e., a 3 or 5-tap horizontal median filter) is effective and not very detrimental (in terms of non-linear artifacts generated) to the video quality.

The adaptive 5-tap median filter 250 performs the two-dimensional filter structures 263–264 indicated in FIG. 1. The top (t) and bottom (b) input values to the median filter are selected by operators 233–234 according to the OperatingMode. This selection is indicated by pixels 281–284 of structures 263–264. The selection is done by the operators 233–234 labeled 'o' by means of the OperatingMode control signal (for simplicity, not shown in FIG. 1) in the manner previously described.

There are several static control signals indicated in FIG. 1. Hierarchically, at the very top is NLF ON/OFF, which, regardless of other operating modes, simply lets the center pixel value (e.g., pixel 272 ) go through filter 250 as if it were never filtered. The register enableNLF enables the operation of the non-linear filter 250 as indicated by OperatingMode. If the non-linear filter 250 is required to change every pixel regardless of its relationship to the median value, then the contents of nlfFraction is set to a high value so that the fraction of the center pixel is very small and any median value will replace the center.

Another embodiment of module 200 is shown in FIG. 2, wherein like numbers refer to like parts. Those skilled in the art will understand the operation of the FIG. 2 embodiment based on the description of the FIG. 1 embodiment.

Figure 3:
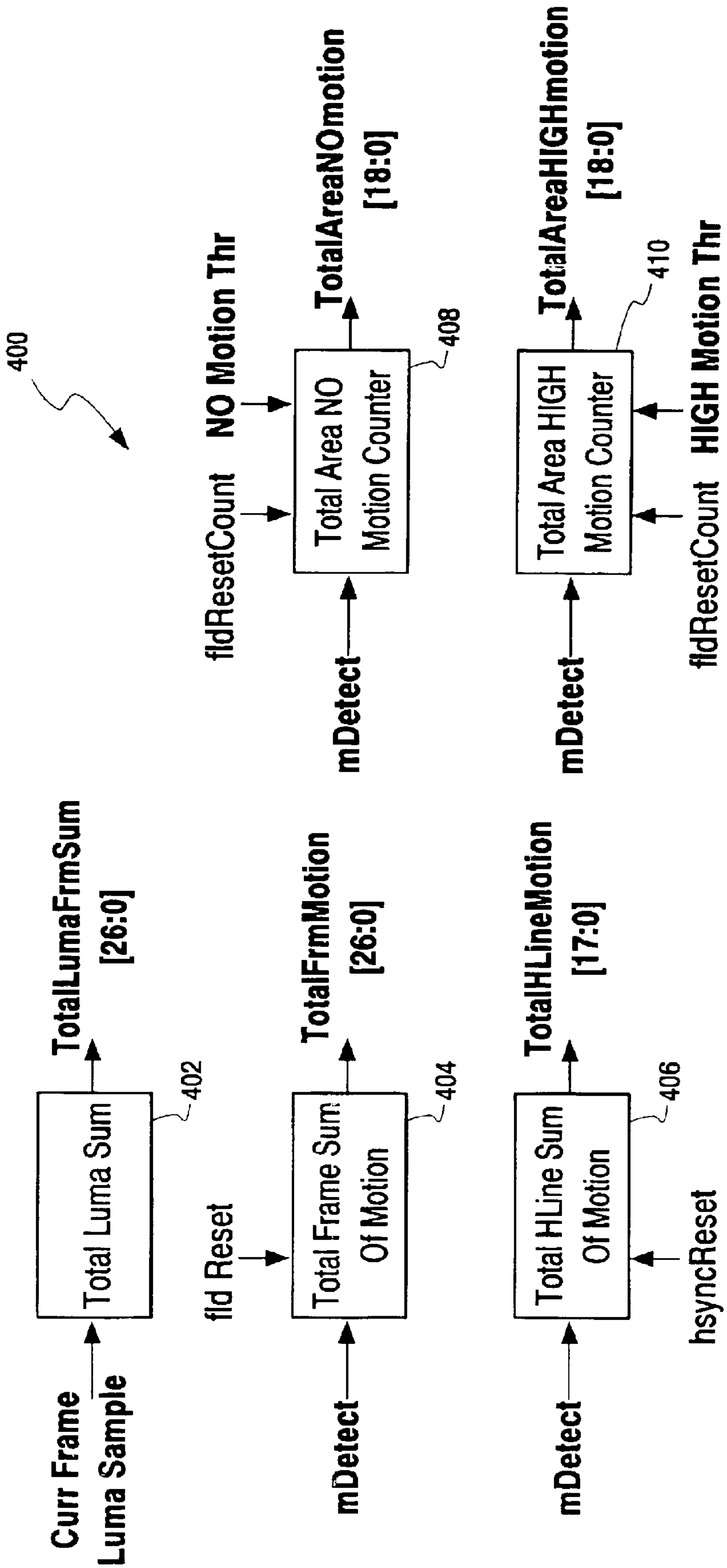
FIG. 3 is a schematic block diagram of a image characterization module used to supply parameter values to the filter shown in FIG. 1.

Throughout this specification, the term image sequence characterization is used to indicate the process of gathering information and making decisions based on video sequence information. The hardware involved for this task is essentially a set of accumulators and counters that keep track of various spatial and temporal data. FIG. 3 shows the signal widths needed for image resolution according to ITU-R656. Horizontal and vertical synchronization signals are used to reset and start accumulating/counting operations, but the values of the previously computed field or line remain stable for the duration of the current field or line until the next synchronization event.

TotalLumaFrmSum is calculated by a counter 402 that keeps track of the sum of all luma pixels in the current frame. This value is an early indication of the average DC value when scaled down by the total image size.

TotalFrmMotion is calculated by a counter 404 that adds the motion detection signal mDetect for the entire current frame. TotalHLineMotion is a horizontal line motion signal calculated by a counter 406 that adds the mDetect signals for the horizontal line above the current horizontal line that includes a pixel being processed (e.g., line 273 shown in FIG. 1). FIG. 3 indicates that counter 406 is reset at every vsync or every hsync of a frame. Firmware is responsible for reading the values at the appropriate interrupt before the counters are reset automatically by the hardware.

The area indicators TotalAreaNOmotion and TotalAreaHIGHmotion are calculated by counters 408 and 410, respectively. TotalAreaNOmotion is a low motion signal corresponding to motion of one or more images and TotalAreaHIGHmotion is a high motion signal corresponding to motion of one or more images. Counters 408 and 410 always count up by one as they are indicators of how many pixels fall within the threshold values indicated by the registers. One example of area is the area indicated by structures 261–264 (FIG. 1). At the end of each field, these registers contain an indication of how many pixels are at the extreme motion detection ranges indicated by the various thresholds. This information is used to globally change motion parameters.

The overall operation of module 200 will be described in the context of the interaction between hardware and firmware to provide dynamic algorithmic control in order to reduce the noise in the input sequence of pixels on path 106.

The operation of module 200 depends on the interaction between hardware and firmware. The hardware is set up by the firmware via control registers and under the assumption of an input video sequence of pixels on path 106 has mild noise reduction requirements. As the sequence progresses, the image characterization module 400 collects temporal and spatial features of the input sequence for the firmware to analyze. The firmware can determine after several frames have passed, more effective parameters for the noise reduction hardware.

Initially, the non-linear noise reduction filter 250 (FIG. 1) is turned OFF or set to operate in 3-tap horizontal mode. If the number of impulsive steps indicated by totalPulses increases for more than a few seconds-worth of video, the firmware may make the decision to progressively use more effective operating modes at the expense of non-linear artifacts.

Sudden large transitions in TotalFrmMotion towards zero (below 5% of total possible frame motion) and correlating spikes in the values of both TotalAreaNoMotion and TotalAreaHighMotion at specific intervals may indicate the existence of a 3:2 pull-down sequence. If sampled values of TotalHLineMotion confirm that there has been no significant line-to-line motion for the same frames, then this would be a further indication of repeated fields at the 3:2 cadence.

A rapid but progressive decrease in the value of TotalLumaFrmSum may indicate a fade-to-black video transition, especially if TotalAreaNoMotion remains fairly constant within the thresholds set for low/high motion.

These transition indications of 3:2 pull-down, fade-out, scene changes, flash changes, etc. can also be derived from the bit utilization observed during encoding. However, when obtained at this stage of processing, preprocessor 10 is provided with at least one frame-time look-ahead warning of the image sequence trends that may affect the quality of encoded video.

The above-described embodiments enable a filter that is both effective and economical. The filter provides video that is properly band limited, with reduced artifacts and reduced noise. Furthermore, the filter provides various parameters that characterize the nature of the input video so the encoder can make better assumptions as to the best ways to compress the video sequence.

Figure 4:
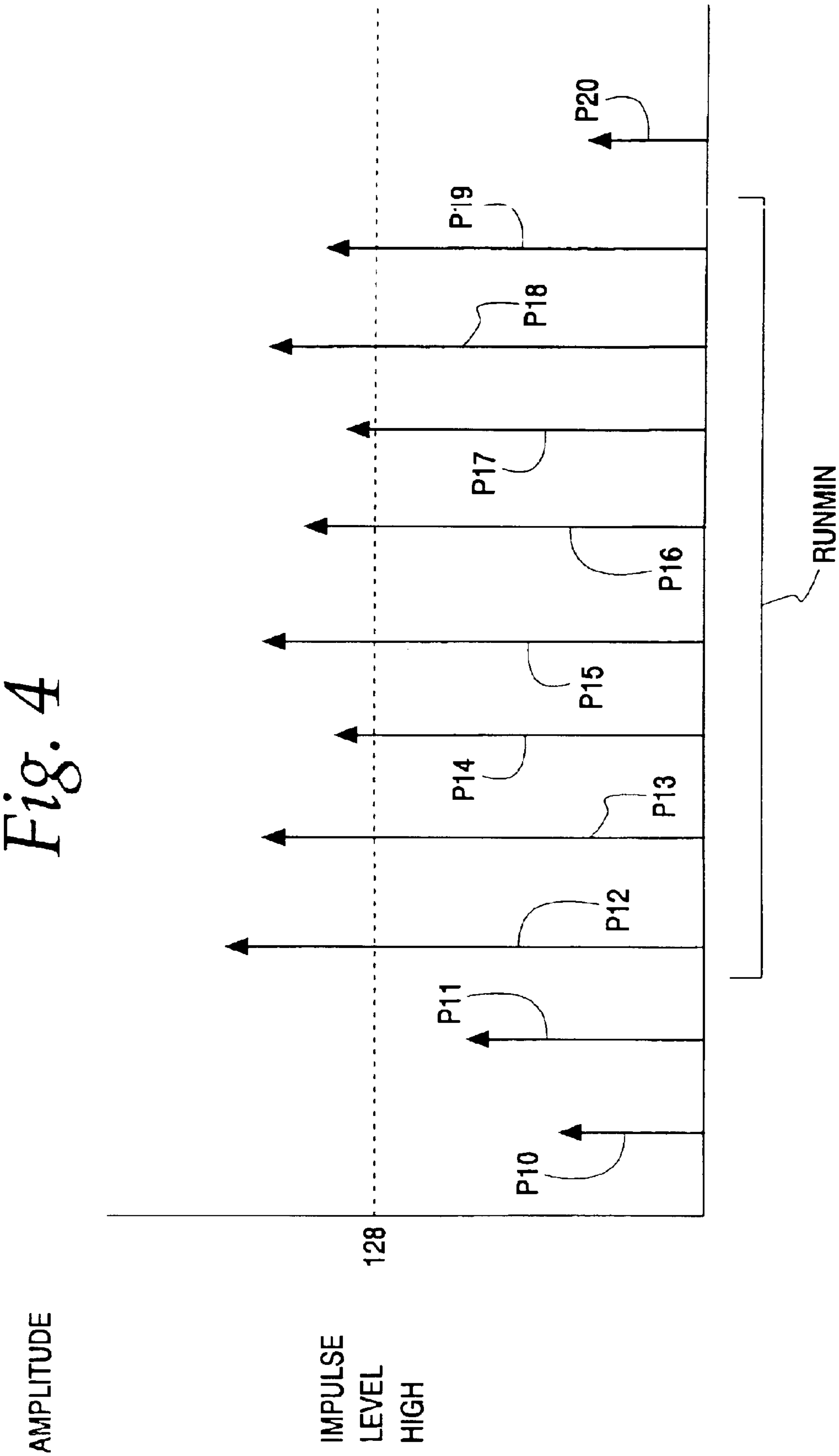
FIG. 4 is a graph illustrating a step impulse for a runMin value.

FIG. 4 is a graph illustrating the operation of one embodiment of impulse detector 244 (FIG. 1). Pixels P10–P20 are pixels of various amplitudes lying in the same horizontal line of a frame. A threshold amplitude ImpulseLevelHigh is compared to the amplitudes of the various pixels. A runMin parameter defines the number of consecutive pixels used to determine a step impulse and the length of the step impulses. For the runMin value of 8 consecutive pixels shown in FIG. 4, a step impulse is counted because all pixels P12–P19 have an amplitude greater than ImpulseLevelHigh and also meet other conditions. The conditions met by pixels P12 and P13 are defined by the following example:

(*Abs*(*P*13−*P*12)<*RLE*range) AND ((*P*13<ImpulseLevelLow) OR (*P*13>ImpulseLevelHigh))

RLErange is a value within which a change in input is considered constant. For example, if this value is 2, any input pixel with a value P is considered the same as those adjacent pixels with values P+2 and P−2. ImpulseLevelHigh is a high amplitude threshold for detecting impulses and ImpulseLevelLow is a low amplitude threshold for detecting impulses.

The values of ImpulseLevelHigh and ImpulseLevelLow can be derived from average pixel amplitude values for an entire frame. For example, the average amplitude can be calculated from the TotalLumaFrmSum value described in connection with FIG. 8 divided by the total number of pixels in the frame. ImpulseLevelHigh can be set to 1.5 times the average amplitude, and ImpulseLevelLow can be set to 0.5 times the average amplitude. In general, pixel amplitudes greater than ImpulseLevelHigh correspond to very bright pixels, and pixel amplitudes less than Impulse Level Low correspond to very dark pixels.

The other pixels in the run length also meet the foregoing conditions. As a result, the pixels runMin pixel group are counted as a step impulse because each of the pixels meets the conditions during the runMin duration, e.g., 8 pixels in this example. In the example of FIG. 4, the RLErange is 16, the amplitude of P13 is 140, the amplitude of P12 is 137, ImpulseLevelLow is 32, ImpulseLevelHigh is 128, the absolute value of P13−P12 is 3, and runMin is 8. Of course, a step impulse also is counted if the conditions are met by pixels with amplitudes below the ImpulseLevelLow value.

Figure 5:
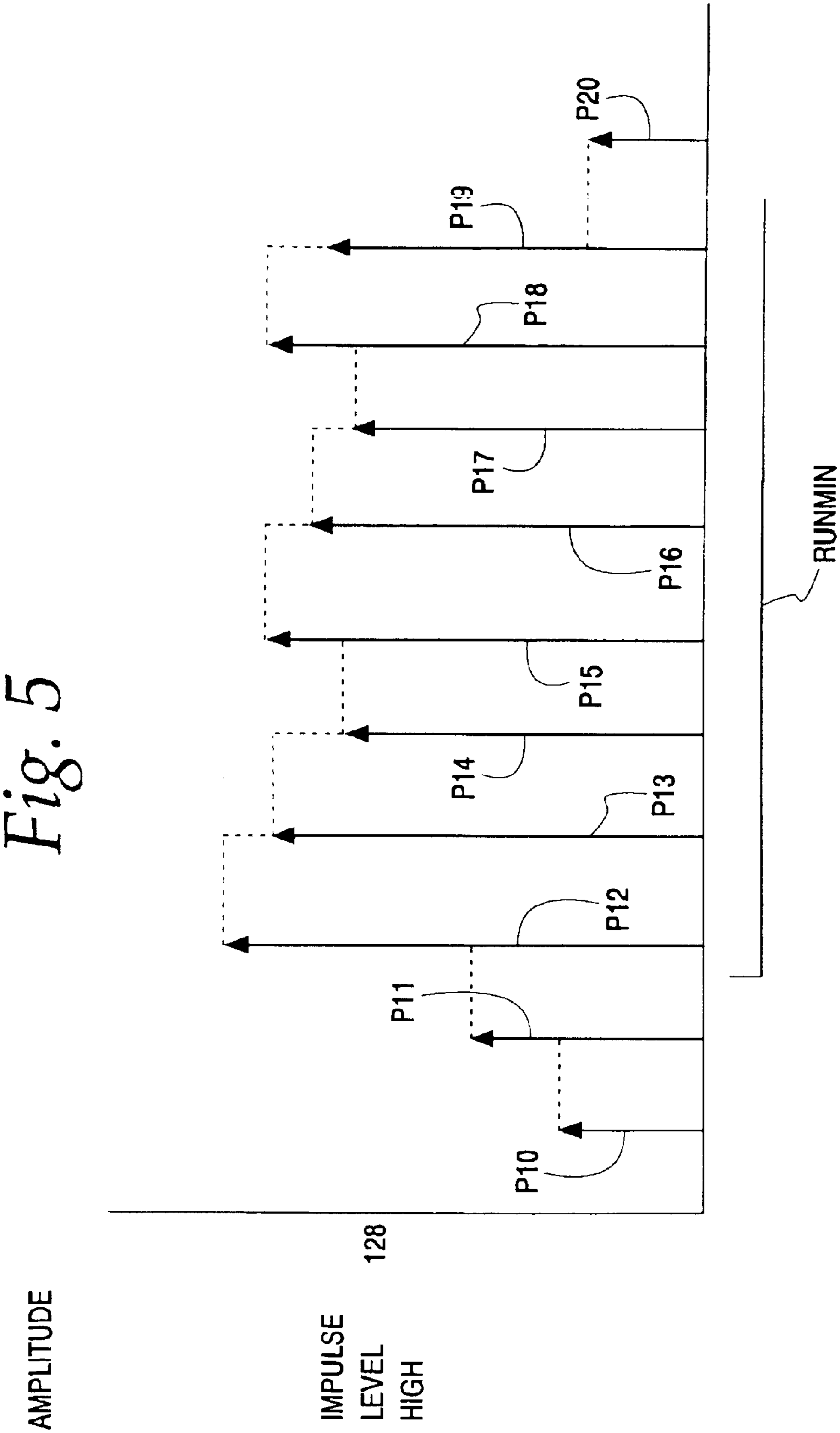
FIG. 5 is a graph like FIG. 4 in which step functions have been indicated by dotted lines.

FIG. 5 illustrates the pixels of FIG. 4 in which step functions have been indicated by dotted lines. Pixels P12–P19 represent a step impulse up in amplitude compared to the amplitudes of pixels P10–P11 and P20.

Figure 6:
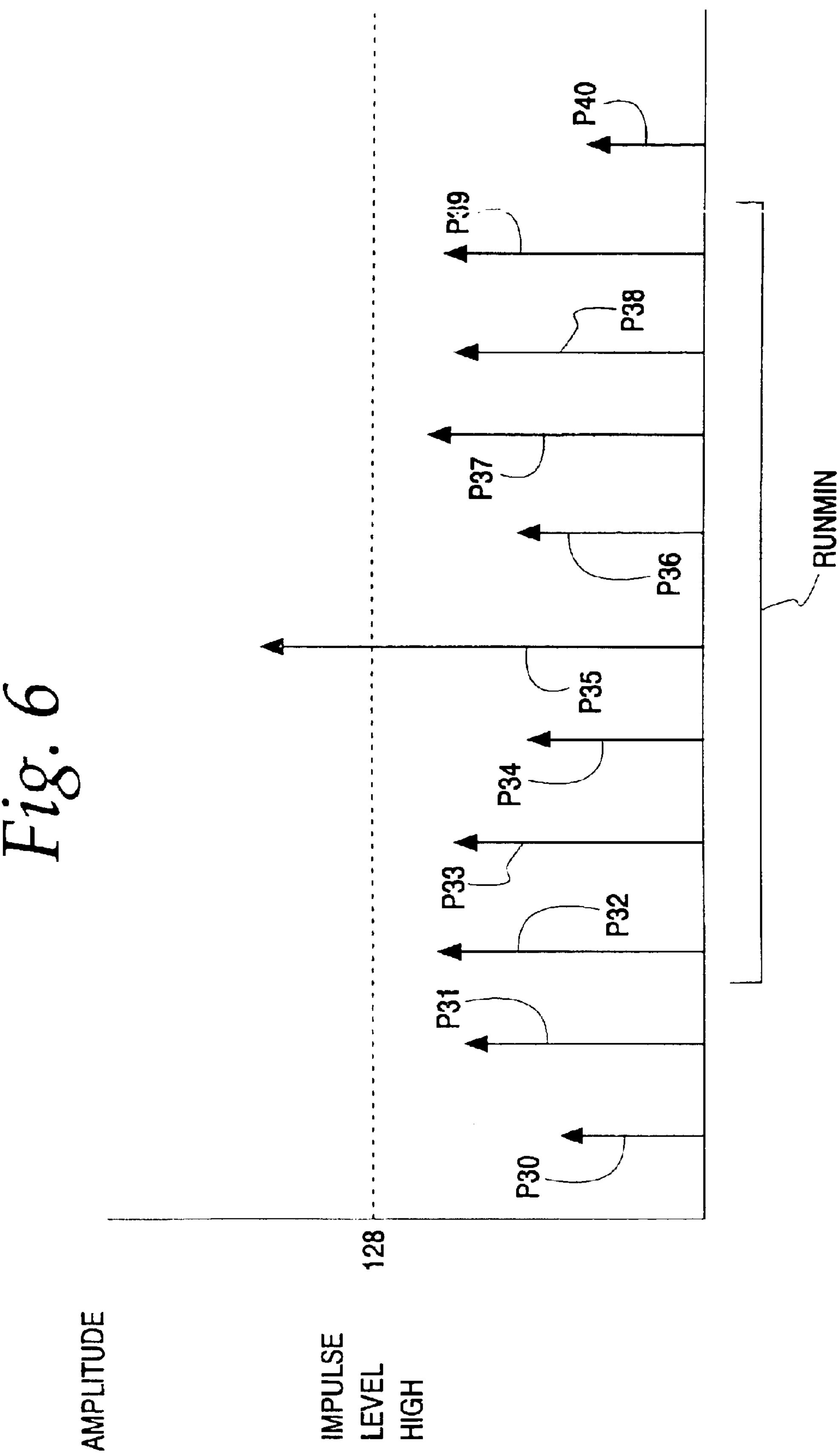
FIG. 6 is a graph illustrating pixel values that do not form a step impulse.

FIG. 6 illustrates a group of pixels P30–P40 lying along the same horizontal line of a frame. The pixels during run length runMin are not counted as a step impulse because they do not meet the conditions described above. For example, only pixel P35 has an amplitude greater than ImpulseLevelHigh.

Figure 7:
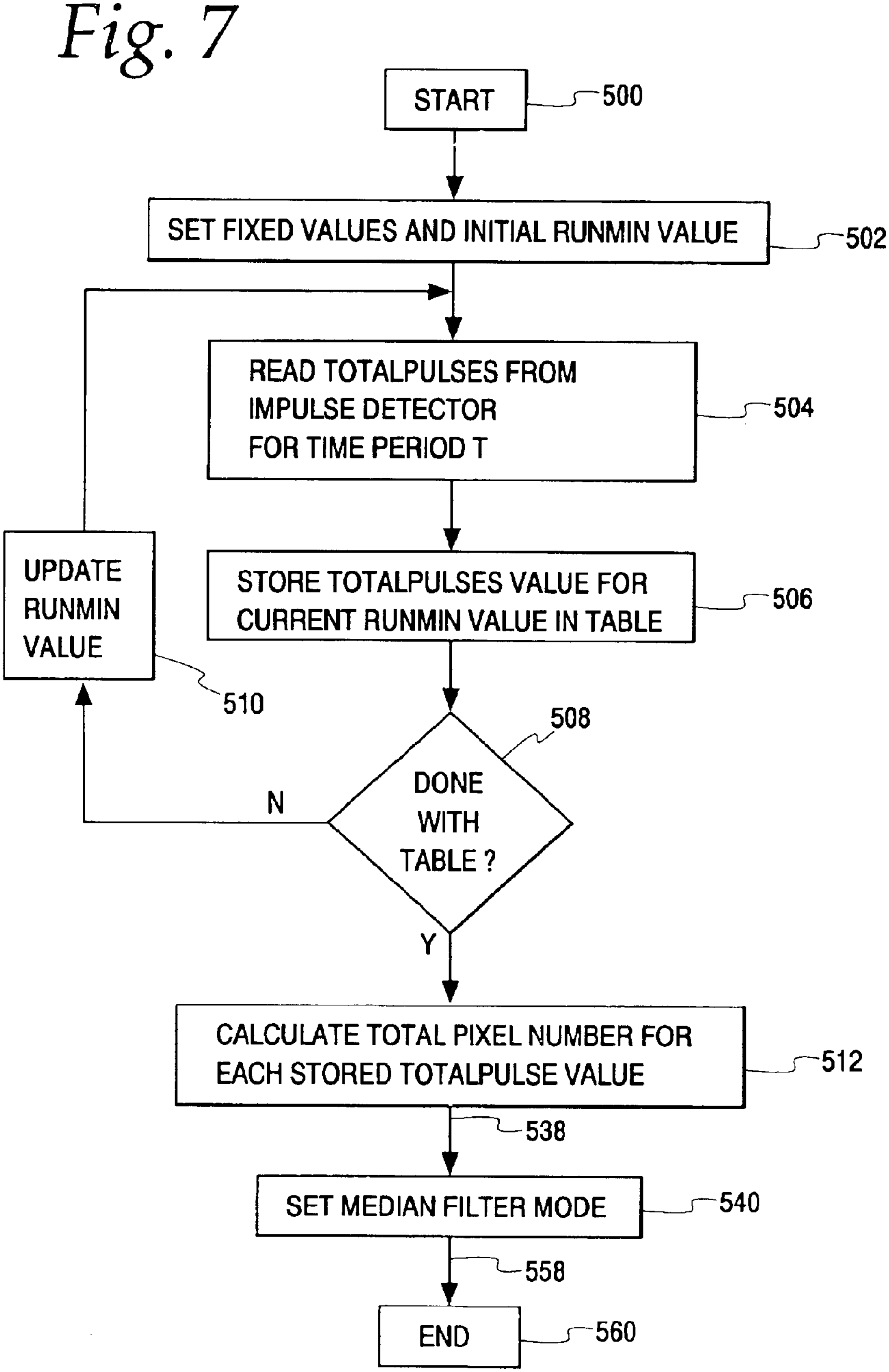
FIG. 7 is a flow diagram illustrating one algorithm executed by the impulse detector shown in FIG. 1.

FIG. 7 describes one embodiment of another algorithm carried out by impulse detector 244 in order to determine the OperatingMode of median filter 250 (FIG. 1). The operation begins with a step 500 and continues with a step 502 in which fixed values are set and an initial runMin value is set. The fixed values include runMin values that are set as shown in the following Table 1:

TABLE 1

| RunMin Value | Number of Impulse Steps Counted | Total Pixels Within Impulse Steps |
|---|---|---|
| 256 | IM0 | TP0 |
| 128 | IM1 | TP1 |
| 64 | IM2 | TP2 |
| 32 | IM3 | TP3 |
| 16 | IM4 | TP4 |
| 8 | IM5 | TP5 |
| 4 | IM6 | TP6 |

The fixed values also include the following:

AVG=TotalLumaFrmSum/Total pixels in picture frame or during processing time T;

enableNLF=true
RLErange=8
motThreshold=32
ImpulseLevelHigh=1.5 times AVG
ImpulseLevelLow=0.5 times AVG
nlfFraction=4

As an example, processing time period T may be 1 second, during which a collection of pixels is evaluated. Typically, about 30 frames of pixels are evaluated during a one second time period.

In a step 504, the total number of impulse steps (calculated as described in connection with FIG. 4) are counted or read for a time period T or for a group of pixels, such as a frame. In a step 506, the number of impulse steps counted is stored as an IM value for the current runMin value in Table 1.

In a step 508, the algorithm determines whether all the relevant values in Table 1 have been processed. If not, in a step 510, the runMin parameter value is updated with the next sequential value from Table 1, and the algorithm loops back to step 504.

If the answer to step 508 is affirmative, the total pixel number for each stored IM totalpulse value in Table 1 is calculated and stored in a step 512. The total pixel number is calculated by multiplying the impulse steps counted during time period T for a particular runMin value times the number of pixels corresponding to the applicable runMin value. In the example of FIG. 4, the number of impulse steps is multiplied by 8, because the runMin value is 8 (i.e., 8 consecutive pixels per run length). After each multiplication, a total pixel value is stored as a TP value in Table 1.

After completing step 512, the algorithm follows a path 538 to a step 540 that sets the operating mode of median filter 250 (FIG. 1).

After completing step 540, the algorithm follows a path 558 to an end step 560.

Figure 8:
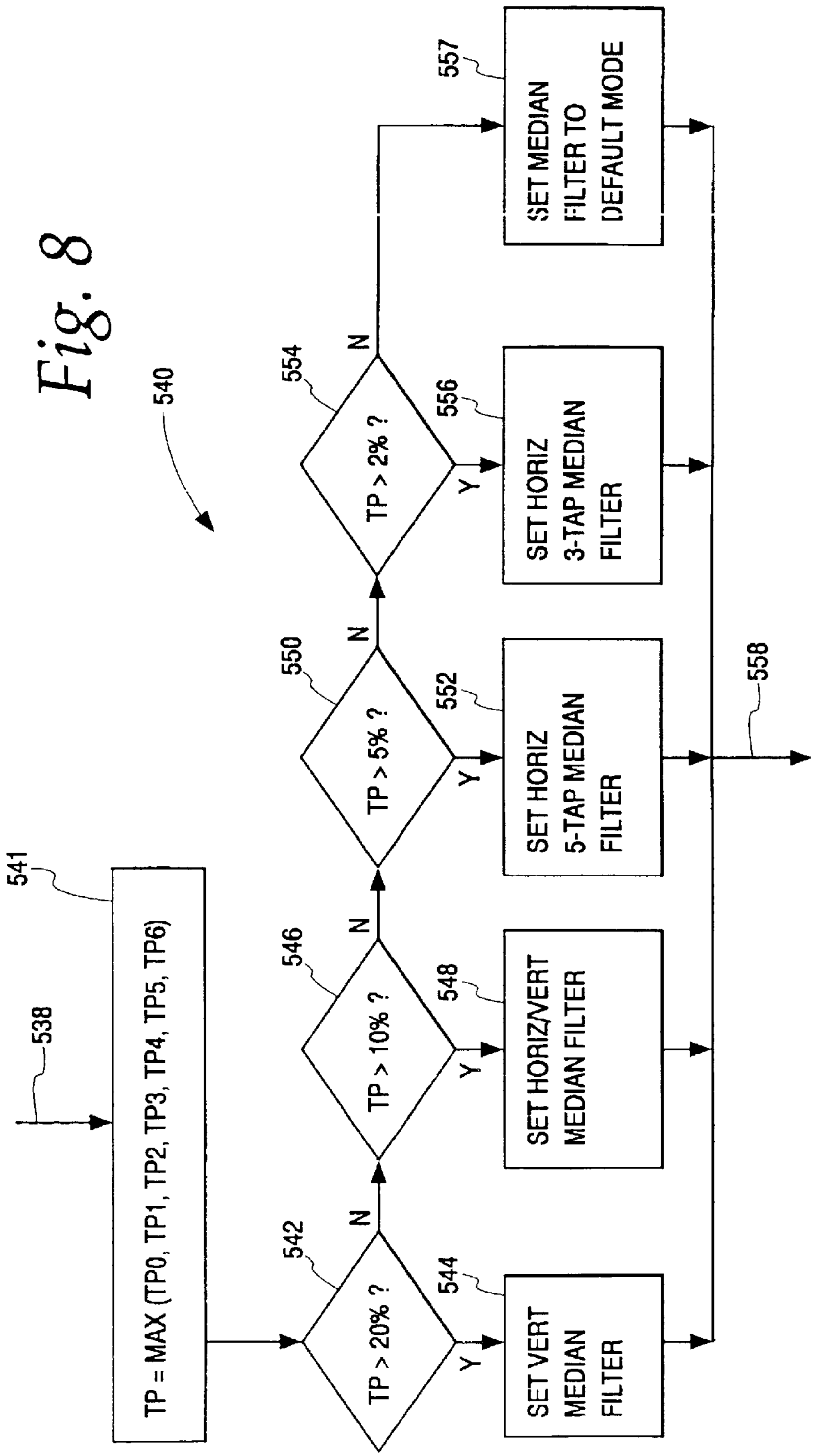
FIG. 8 is a flow diagram illustrating an algorithm used to set the operating mode of the motion adaptive non-linear filter shown in FIG. 1.

FIG. 8 describes in more detail step 540 shown in FIG. 7 for setting the mode of filter 250. In a step 541, a value TP is set equal to the maximum TP value stored in Table 1.

In steps 542, 546, 550 and 554, the algorithm compares the TP value with various numbers of pixels expressed as a percentage of the total number of pixels processed during time T or in a frame, whichever criteria was used to calculate the IM0–IM6 values shown in Table 1. More specifically, the % term in the previous steps indicates the number of pixels corresponding to the total pixels in processing time period T or the total number of pixels in a frame, which ever criteria is used to determine the TP values in Table 1. For example, if 345,600 pixels are processed during time period T, then 2% of 345,600 is 6,912 pixels. Thus, in the expression TP>2% shown in FIG. 8, the value of TP from step 541 is compared with 6,912.

In a step 542, if TP is greater than 20%, then in a step 5544, filter 250 is set to the MED_MODE_VERT 1 mode of operation using the 3-tap vertical median filter. If TP is not greater than 20%, the operation passes to a step 546.

In step 546, if TP is greater than 10%, then in a step 548, filter 250 is set to the MED_MODE_HV 2 mode of operation using the 5-tap horizontal/vertical median filter. If TP is not greater than 10%, the operation passes to a step 550.

In step 550, if TP is greater than 5%, then in a step 552, filter 250 is set to the MED_MODE_HORZ 5 mode of operation using the 5-tap horizontal only median filter. If TP is not greater than 5%, the operation passes to a step 554.

In step 554, if TP is greater than 2%, then in a step 556, filter 250 is set to the MED_MODE_HORZ 0 mode of operation using the 3-tap horizontal median filter.

If TP is not greater than 2%, then in a step 557, the mode of operation of filter 250 is set to the default mode in which filter 250 is turned off so that the center pixel value in a group of pixels being processed goes through filter 250 as if it were never filtered.

The operation described in FIG. 8 may be expressed as follows:

TP=max(TP0, TP1, TP2, TP3, TP4, TP5, TP6)

If TP>20%, set filter 250 to MED_MODE_VERT 1

Else if TP>10%, set filter 250 to MED_MODE_HV 2

Else if TP>5%, set filter 250 to MED_MODE_HORZ5 3

Else if TP>2%, set filter 250 to MED_MODE_HORZ 0

Else, set filter 250 to default mode.

For all the % values shown in FIG. 8, it is assumed that the values are valid for a normal operating mode. For more aggressive operation (e.g., more noise reduction) the actual values (thresholds) of the percentage % values should be reduced. For example, a very aggressive approach would be:

If TP>5%, set filter 250 to MED_MODE_VERT 1

Else if TP>2.5%, set filter 250 to MED_MODE_HV 2

Else if TP>1.25%, set filter 250 to MED_MODE_HORZ5 3

Else if TP>0.625%, set filter 250 to MED_MODE_HORZ 0

Else, set filter 250 to default mode.

Each of the registers identified in FIGS. 1–3 is described in more detail in the following section.

Non-Linear Motion Adaptive Noise Reduction

Non-Linear Control Register

| Bit Field | Name | Description |
|---|---|---|
| 23:22 | OperatingMode_UV | Controls the behavior of the 2D Median filter structure<br>0: MED MODE HORZ, 3-tap Horizontal Median Filter<br>1: MED_MODE_VERT, 3-tap Vertical Median Filter<br>2: MED_MODE_HV, 5-tap Horizontal/Vertical (Cross) Median<br>3: MED_MODE_HORZ5, 5-tap Horizontal only Median Filter |
| 21:20 | OperatingMode_Y | Controls the behavior of the 2D Median filter structure<br>0: MED_MODE_HORZ, 3-tap Horizontal Median Filter<br>1: MED_MODE_VERT, 3-tap Vertical Median Filter<br>2: MED_MODE_HV, 5-tap Horizontal/Vertical (Cross) Median<br>3: MED_MODE_HORZ5, 5-tap Horizontal only Median Filter |
| 19 | enableNLF_UV | Enable operation of non-linear filter as indicated by OperatingMode |
| 18 | enableNLF_Y | Enable operation of non-linear filter as indicated by OperatingMode |
| 17 | NLF ON/OFF (UV) | Completely turns ON/OFF the operation of the non-linear filter 250. When OFF, the value of this bit register is zero and the output of the median filter is always the input center pixel. |

-continued

| Bit Field | Name | Description |
|---|---|---|
| 16 | NLF ON/OFF (Y) | Completely turns ON/OFF the operation of the non-linear filter 250. When OFF, the value of this bit register is zero and the output of the median filter is always the input center pixel. |
| 15:8 | KnlfGainUV | IIR low pass filter 204 gain. This value is less than unity and implemented as a binary shift right of range [½ . . . 0] |
| 7:0 | KnlfGainY | IIR low pass filter 204 gain. This value is less than unity and implemented as a binary shift right of range [½ . . . 0] |

RunLength Processor Control Register

| Bit Field | Name | Description |
|---|---|---|
| 31:26 | UVnlfFraction | Used to shift left (reduce) the value of the center UV pixel during median filtering in order to set a content-based threshold for application of the median operator. |
| 25:20 | YnlfFraction | Used to shift left (reduce) the value of the center Y pixel during median filtering in order to set a content-based threshold for application of the median operator. |
| 19:12 | motThreshold | When mDetect is above this value, it is considered to be caused by a large impulsive discontinuity in the input. |
| 11:8 | runMin | Determines how many consecutive pixels (samples) of the same value (within RLErange) are considered to belong to the same pulse run. |
| 7:0 | RLErange | Value within which a change in input is considered constant. For example, if this value is 2, any input pixel with value P is considered the same as those adjacent pixels with values P + 2 and P − 2 |

Total Pulses Detected Register

The value in this register remains valid for the duration of the current field and is changed only at vertical sync. This way, the firmware can always read the value of the previous field at any time. These registers should not overflow.

| Bit Field | Name | Description |
|---|---|---|
| 31:16 | totalPulsesUV | Total pulses detected in the UV signal, as defined by the RunLength Control register |
| 15:0 | totalPulsesY | Total pulses detected in the Y signal, as defined by the RunLength Control register |

Impulse Level Threshold Register

This register defines the values used as low, high and size of impulses in order to determine their effect on processing.

| Bit Field | Name | Description |
|---|---|---|
| 23:16 | ImpulseLevelHigh | High threshold for detecting impulses of size specified below |
| 15:8 | ImpulseLevelLow | Low threshold for detecting impulses of size specified below |

-continued

| Bit Field | Name | Description |
|---|---|---|
| 7:0 | ImpulseSize | Value of what is consired an impulse when detected |

Image Characterization

The values in these registers remain valid for the duration of the current field and are changed only at vertical or horizontal sync, as the case may be. This way, the firmware can always read the value of the previous field at ay time. The status count registers should not overflow.

Sum of Luminance Register

| Bit Field | Name | Description |
|---|---|---|
| 26:0 | TotalLumaFrmSum | Adds all pixels in luma for the current frame |

Total Temporal Frame Register

| Bit Field | Name | Description |
|---|---|---|
| 26:0 | TotalFrmMotion | Adds all the motion detected between the current and previous frames |

Total Horizontal Line Motion Register

This register is double-buffered and guaranteed to always be ready by the firmware with stable values.

| Bit Field | Name | Description |
|---|---|---|
| 26:18 | HmotionLineCount | Indicates the horizontal line to which TotalHLineMotion belongs |
| 17:0 | TotalHLineMotion | Adds all the motion detected between line above in the current frame and the line above in the previous frame |

Total Area Containing No Motion Register

| Bit Field | Name | Description |
|---|---|---|
| 26:19 | NO Motion Threshold | All pixels with motion values detected below this threshold are considered static. |
| 18:0 | TotalAreaNoMotion | Counts all the pixel locations where there was no motion as indicated by the threshold value |

Total Area Containing High Motion Register

| Bit Field | Name | Description |
|---|---|---|
| 26:19 | HIGH Motion Threshold | All pixels with motion values detected above this threshold are considered largely moving. |
| 18:0 | TotalAreaHighMotion | Counts all the pixel locations where there was a lot of motion as indicated by the threshold value |

The foregoing embodiments offer the following advantages:

A dedicated impulsive noise detector improves noise reduction by reducing undesirable byproduct artifacts;

An impulsive noise reduction process is improved by application based on the impulse noise detector;

The effectiveness of spatial-filtering techniques alone is improved;

Two-dimensional detail is preserved by dynamic and adaptive application of an impulsive filter;

Dynamic control on a pixel-by-pixel basis allows fine grain control of filtering process;

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. For example, impulse reducer 250 can be implemented by software in the manner previously described. Therefore, it is intended that the invention not be limited to the particular embodiment disclosed, but that the invention will include all embodiments falling within the scope of the appended claims.

What is claimed is:

1. Apparatus for reducing random noise in video pixels having digital pixel values by processing the pixel values, said apparatus comprising:

an impulse detector arranged to perform a step impulse detecting process and to generate control signals is in response detection of step impulses represented by the pixel values; and an impulse reducer responsive to the pixel values and the control signals to generate filtered pixel values with reduced impulses, wherein the step impulse detecting process comprises:

generating a first signal if the absolute difference between the pixel value being processed and an adjacent pixel value is less than a difference threshold value;

generating a second signal if the value of the pixel being processed is greater than a high level value or less than a low level value and the first signal is generated;

counting the number of consecutive pixels for which the second signal is generated; and generating a third signal indicating a step impulse if the counting results in a number greater than a predetermined minimum number.

2. The apparatus of claim 1 wherein the impulse detector generates one of the control signals if a value of one of the corrected motion signals exceeds a motion threshold and the third signal is generated.

3. The apparatus of claim 1 wherein the impulse detector performs a process comprising:

storing the predetermined minimum number and a plurality of additional predetermined minimum numbers of different values;

performing the step impulse detecting process at least once for each of the predetermined minimum numbers;

counting the number of step impulses corresponding to each of the predetermined minimum numbers to generate a plurality of step impulse counts; and determining the total number of pixels corresponding to each of the step impulse counts to generate a plurality of pixel counts.

4. The apparatus of claim 3 wherein the impulse reducer operates in a plurality of different modes and wherein the apparatus performs a process comprising:

determining the maximum pixel count among the plurality of pixel counts;

determining the total number of pixels processed during the step impulse detecting process;

storing a plurality of predetermined fraction values corresponding to fractions of the total number of pixels processed; and selecting one of the plurality of different modes depending on the relationship between maximum pixel count and the plurality of predetermined fraction values.

5. The apparatus of claim 1 wherein the impulse detector detects step impulses having a plurality of lengths, wherein the impulse reducer operates in a plurality of modes and wherein the apparatus performs a process comprising:

selecting a first one of the plurality of modes if the plurality of lengths have a first predetermined relationship with respect to the total number of pixels processed during the step impulse detecting process; and selecting a second one of the plurality of modes if the plurality of lengths have a second predetermined relationship with respect to the total number of pixels processed during the step impulse detecting process.

6. The apparatus of claim 5 wherein the process further comprises selecting one of the plurality of modes only if one of the corrected motion signals exceeds a motion threshold.

7. The apparatus of claim 5 wherein the impulse reducer comprises a median filter.

8. The apparatus of claim 7 wherein the plurality of modes of the filter comprise:

a horizontal filter mode;

a vertical filter mode; and a horizontal and vertical filter mode.

9. The apparatus of claim 8 wherein the filter selects the pixel value that resides arithmetically in the middle of the distribution of pixel values presented to the filter.

10. The apparatus of claim 1 wherein the apparatus processes the pixels on a pixel-by-pixel basis.

11. The apparatus of claim 1 wherein the pixel values comprise pixel luminance values.

12. A method of reducing random noise in video pixels having digital pixel value by processing the pixel value, said method comprising:

performing a step impulse detecting process to generate control signals in response detection of step impulses represented by the pixel values; and generating impulse-reduced pixel values in response to the pixel values and the control signals;

wherein the step impulse detecting process comprises:

generating a first signal if the absolute difference between the pixel value being processed and an adjacent pixel value is less than a difference threshold value;

generating a second signal if the value of the pixel being processed is greater than a high level value or less than a low level value and the first signal is generated;

counting the number of consecutive pixels for which the second signal is generated; and generating a third signal indicating a step impulse if the counting results in a number greater than a predetermined minimum number.

13. The method of claim 12 wherein one of the control signals is generated if a value of one of the corrected motion signals exceeds a motion threshold and the third signal is generated.

14. The method of claim 12 and further comprising:

storing the predetermined minimum number and a plurality of additional predetermined minimum numbers or different values;

performing the step impulse detecting process at least once for each of the predetermined minimum numbers;

counting the number of step impulses corresponding to each of the predetermined minimum numbers to generate a plurality of step impulse counts; and determining the total number of pixels corresponding to each of the step impulse counts to generate a plurality of pixel counts.

15. The method of claim 14 wherein generating impulse-reduced pixel values operates in a plurality of different modes and wherein the method further comprises:

determining the maximum pixel count among the plurality of pixel counts;

determining the total number of pixels processed during the step impulse detecting process;

storing a plurality of predetermined fraction values corresponding to fractions of the total number of pixels processed; and selecting one of the plurality of different modes depending on the relationship between maximum pixel count and the plurality of predetermined fraction values.

16. The method of claim 14 wherein the step impulse detecting process detects step impulses having a plurality of lengths, wherein the generating impulse-reduced pixel values operates in a plurality of operating modes and wherein the method further comprises:

selecting a first one of the plurality of operating modes if the plurality of lengths have a first predetermined relationship with respect to the total number of pixels processed during the step impulse detecting process; and selecting a second one of the plurality of operating modes if the plurality of lengths have a second predetermined relationship with respect to the total number of pixels processed during the step impulse detecting process.

17. The method of claim 16 wherein the process further comprises selecting one of the plurality of operating modes only if one of the corrected motion signals exceeds a motion threshold.

18. The method of claim 16 wherein the generating impulse-reduced pixel values comprises median filtering.

19. The method of claim 18 wherein the plurality of operating modes comprises:

a horizontal filter mode;

a vertical filter mode; and a horizontal and vertical filter mode.

20. The method of claim 17 wherein the generating impulse-reduced pixel values comprises selecting the pixel value that resides arithmetically in the middle of the distribution of pixel values evaluated during generating impulse-reduced pixel values.

21. The method of claim 12 comprising processing the pixels on a pixel-by-pixel basis.

22. The method of claim 12 wherein the pixel values comprise pixel luminance values.

* * * * *